United States Patent
Bonomi et al.

(10) Patent No.: US 7,177,317 B2
(45) Date of Patent: *Feb. 13, 2007

(54) FLEXIBLE SCHEDULER IN AN ASYNCHRONOUS TRANSFER MODE (ATM) SWITCH

(75) Inventors: Flavio Giovanni Bonomi, Palo Alto, CA (US); Kannan Devarajan, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 731 days.

This patent is subject to a terminal disclaimer.

(21) Appl. No.: 10/103,912

(22) Filed: Mar. 25, 2002

(65) Prior Publication Data

US 2002/0105952 A1    Aug. 8, 2002

Related U.S. Application Data

(63) Continuation of application No. 08/976,686, filed on Nov. 24, 1997, now Pat. No. 6,396,834.

(51) Int. Cl.
*H04L 12/28* (2006.01)
*H04L 12/56* (2006.01)
*H04L 12/54* (2006.01)
*H04J 3/24* (2006.01)

(52) U.S. Cl. ............. 370/412; 370/422; 370/429; 370/474

(58) Field of Classification Search .............. 370/235, 370/397–399, 422, 428–429, 474, 412
See application file for complete search history.

(56) References Cited

U.S. PATENT DOCUMENTS

| | | | |
|---|---|---|---|
| 5,418,781 A | 5/1995 | Kaufman et al. | |
| 5,870,394 A | 2/1999 | Oprea | |
| 6,094,431 A * | 7/2000 | Yamato et al. | 370/395.21 |
| 6,148,000 A | 11/2000 | Feldman et al. | |
| 6,185,209 B1 | 2/2001 | Wicklund | |
| 6,396,834 B1 * | 5/2002 | Bonomi et al. | 370/394 |
| 2002/0034163 A1 * | 3/2002 | Hamamoto et al. | 370/230.1 |

* cited by examiner

*Primary Examiner*—Kevin C. Harper

(57) ABSTRACT

A flexible scheduler in an ATM switch. The scheduler enables each connection to be served fairly according to associated quality of service parameters, while enabling several other features. A connection can be shaped while minimizing additional memory and processing requirements. Specifically, the conformance time of cells of a connections need not be stored when significant backlog exists in the transmission of the cells. The shaping rate can be dynamically varied. Sequence of cells forming a frame are buffered in the ATM switch until the end of frame cell is received. All the cells of a frame are then sent in quick succession.

14 Claims, 9 Drawing Sheets

FLEXIBLE SCHEDULER IN AN ASYNCHRONOUS TRANSFER MODE (ATM) SWITCH

RELATED APPLICATIONS

This application is a continuation of the application Ser. No. 08/976,686, Entitled, "A Flexible Scheduler in an Asynchronous Transfer Mode (ATM) Switch", Filed: Nov. 24, 1997 now U.S. Pat. No. 6,396,834, and is incorporated in its entirety herewith.

The present application is also related to U.S. Pat. No. 6,219,352, Entitled, "Queue management with support for multicasts in an asynchronous transfer mode (ATM) switch", (hereafter "RELATED APPLICATION 1"), and is incorporated by reference in its entirety herewith.

BACKGROUND OF THE INVENTION

1. Field of the Invention

The present invention relates generally to communication networks, and more specifically to a method and apparatus for scheduling cells in queues for transmission in an asynchronous transfer mode (ATM) switch.

2. Related Art

Different types of communication networks have evolved in the past to provide different types of services. For example, voice networks allow users to converse in a telephone conversation and data networks allow users to share vast quantities of data. In general, each type of communication network can have different requirements for providing the corresponding services. As an illustration, voice networks may need predictable bandwidth with low latencies to support voice calls while data networks may need high bandwidth in bursts to support large data transfers.

Due to such varying requirements, different types of communication networks have evolved with separate communication backbones, possibly implemented with different technologies. Often, these different technologies are implemented using very different techniques or principles. For example, voice networks have been implemented using a technique commonly referred to as time division multiplexing, which provides fixed and predictable bandwidth for each voice channel. On the other hand, data networks (such as those based on Internet Protocol) have been implemented to share available bandwidth on demand. That is, any end-system of a data network can potentially use all the available bandwidth at a given instance of time, and then the other systems have all the bandwidth for use.

In general, having separate communication backbones for communication networks results in inefficiency in the usage of the overall bandwidth. According to the well-known principle of 'economy of scale', ten servers serving hundred customers of a single queue generally provide slower service than thousand servers serving ten thousand clients even though the server-client ratio is the same. There is more efficiency with larger numbers typically because any of the larger pool of available servers can immediately serve a customer in a queue, and thus keep the queue length short.

The inefficiency (due to separate communication backbones) can result in degradation of aggregate service levels or in inability to provide more services. The problem can be exasperated with the increasing demands being placed on the networks. In addition, the overhead to manage the separate networks may be unacceptably high due to the increased number of components in the overall system. Further, the same end-station can be providing different services, which have varying requirements. For example, a computer system may be used for diverse applications such as data sharing, telephone conversations, and video conferencing applications.

Accordingly, the communications industry has been migrating towards a shared communications backbone for all the different types of services. Asynchronous transfer mode (ATM) is one standard which allows such a shared communication backbone. In general, an ATM network includes several ATM switches connecting several end-systems. Each switch includes several ports to connect to end systems and other switches. A switch receives a cell on one port and forwards the cell on another port to provide a connection between (or among) the end-systems.

To communicate with another end-system, an end-station of a communication network usually 'opens a connection'. Opening a connection generally refers to determining a sequence of switches between the two end-stations such that the switches provide at least one communication path between the two end-stations with any specific service levels required for the communication. Once a connection is established, the end systems communicate with each other using cells in an ATM environment. The switches in the communication path receive cells on one port and forward the received cells on another port to support the connection.

Switches often maintain internal queues while transferring cells from one port to the other. The cells are buffered in the queues awaiting their turn for transmission. A scheduler determines the order of transmission of the queued cells according to a scheduling scheme. In one scheduling scheme, a queue is maintained for each connection, which provides the flexibility to serve each connection according to the specific service parameters (known as quality of service 'QoS' parameters) with which the connection may have been setup. The scheduler needs to schedule cells for transmission to meet these service requirements.

One such service requirement is fair scheduling. Fairness generally refers to proportional allocation of bandwidth to individual connections consistent with the QoS parameters associated with each connection. The QoS parameters can include, among others, a desired bandwidth and a priority for each connection. For example, assuming equal priority, cells belonging to a higher bandwidth connection may need to be transmitted more often than cells belonging to lower bandwidth connections independent of the order in which the cells of the connections may have arrived into the switch or at the output port during internal processing in the switch.

Another service requirement is 'shaping'. Shaping refers to the provision of a specified maximum bandwidth ("shaping rate") to a connection. Shaping provides the ability to restrict a connection from using more bandwidth than the shaping rate. Such restriction provides a network manager the ability to establish cost structures commensurate with the bandwidth a connection can use. In addition, shaping can prevent switches or end-systems down the connection path from being over-flooded with cells from the connection.

A scheduler may need to schedule cells of a connection while restricting the maximum bandwidth used by the connection to the shaping rate. The scheduling function may need to be performed without consuming undue amounts of memory space or processing power to avoid throughput performance bottlenecks in the switch. Therefore, what is needed is a scheduler which can shape a connection without requiring excessive memory or processing power.

In addition, a scheduler may need to support dynamic change of shaping rate. For example, if the ATM backbone is lightly congested, it may be desirable to increase the shaping rate of a connection. The level of congestion can be determined, for example, based on available bit rate (ABR) ATM service, which is communicated to other switches in a connection path.

Another feature which may enhance the acceptance of ATM technology is efficient support for transmission of frames. Frames typically refer to data packets sent by end-systems such as those in the Internet Protocol environment. A frame is usually broken into small cells suitable for transmission on ATM communications backbones, and reassembled before being delivered to the end-system. Accordingly, what is also needed is a scheduler which supports the efficient transmission of frames in an ATM backbone.

Yet another requirement may be that all the above service requirements and features may need to be supported in one integrated framework so that a switch can be designed to provide all the features. The framework needs to take into consideration what may appear as contradictory requirements. For example, when scheduling cells of a non-shaped connection, it is generally acceptable (and many times desirable) to provide more bandwidth than which is desired for the non-shaped connection. In contrast, the shaped connections need to be restricted from using more bandwidth than the shaping rate.

Therefore, what is also needed is an integrated framework which enables the provision of any of the desired features and services noted above as requested on a per-connection basis.

SUMMARY OF THE INVENTION

The present invention is directed to a flexible scheduler in a cell switch. The scheduler enables the cells of various connections to be scheduled fairly while providing for efficient shaping (or non-shaping) and frame transmission in an integrated framework. By providing all the feature in an integrated framework, the present invention simplifies the implementation of schedulers in accordance with the present invention. Fairness generally refers to proportional allocation of bandwidth to individual connections consistent with the QoS parameters associated with each connection.

In one embodiment, fairness is achieved by defining several groups of scheduling buckets for each port of a switch. Buckets can be implemented as a first-in-first-out (FIFO) queue using linked lists. Each group has an associated bandwidth range. A group serves connections having a bandwidth, which falls in the associated range.

Fairness can be maintained first at a group level, and then among connections within a group. That is, a group having connections with more aggregate bandwidth may be allocated more turns for transmission on a port than a group having connection with lesser aggregate bandwidth range. Similarly, within a group, a cells on a connection having a high desired bandwidth is provided more turns for transmission than cells on a connection having a low desired bandwidth.

Fairness can be maintained even when a connection is shaped or not shaped or whether the connection is transferring cells forming a frame as described below. In addition, the bandwidth allocated to each connection can also be dynamically varied as also described below.

For a group serving non-shaped connections, fairness is achieved by associating a bucket gap, which is inversely proportional to the desired bandwidth of a connection or proportional to the average intercell arrival time of the connection. When a cell of a connection is scheduled for transmission, the next cell in the connection is placed a number of buckets equal to the bucket gap away from the current bucket. A current bucket may be defined as a bucket from which cells are considered presently for transmission. Cells in a next bucket are considered for transmission only after transmitting all cells in a current bucket. Cells within a bucket can be transmitted in a FIFO scheme.

By allocating a cell to a bucket, the cell's turn for transmission is defined to be after the turn of all cells in the intermediate buckets between the current bucket and the allocated bucket. Thus, the relative turn of a cell is defined by the bucket to which it is assigned, and the order of arrival within the bucket. As successive cells of a connection are assigned to buckets which are apart by bucket gap, connections with large bucket gaps are allocated lower bandwidth than connections with small bucket gaps. Accordingly, fairness is achieved among connections served by a group.

A connection can be shaped in the framework of above. Specifically, a connection is shaped by generally ensuring that any two successive cells of a connection do not depart with an intercell time of less than that determined by the shaping rate. Accordingly, a conformance time is computed for each cell of the connection. Conformance time represents the earliest time a corresponding cell may depart for transmission.

The conformance time is used to select a bucket for a cell by logically associating a bucket interval (i.e., defined by a start time coordinate and an end time coordinate) with each bucket. A cell may be placed in a bucket if the conformance time of the cell falls within the bucket interval of the bucket. Cells in buckets can be scheduled for transmission as in non-shaped connections (i.e., consider a next bucket only after all cells of the current bucket are scheduled for transmission, and FIFO scheme within a bucket), with the additional requirement that a cell is not allowed to depart for transmission until the corresponding conformance time is reached.

In one embodiment, the conformance time for each cell is computed by Equations $$C(j)=\text{MAX}[E(j),A(j)] \qquad \text{[Equation (1)]}$$

$$E(j+1)=C(j)+T \qquad \text{[Equation (2)]}$$

wherein, $C(j)$ represents the conformance time of a cell j, $E(j)$ represents the expected arrival time of a cell j, $A(j)$ represents the arrival time for cell j, and T represents the average intercell time for a queue for a desired shaping rate. The arrival time is defined as the time a cell is placed from a connection queue into a scheduling bucket. As the conformance time of a cell is at least as much as the conformance time of a previous cell plus the intercell time (T), cells depart with an interval of at least T. Accordingly, shaping is achieved. The shaping rate is defined by the intercell time T.

From Equations (1) and (2), it is noted that the computation of conformance time of a current cell requires the conformance time of a previous cell of the connection. Accordingly, the conformance time of the previous cell may be stored in an internal memory, and when the current cell needs to be scheduled, the stored conformance time is retrieved to compute the conformance time of the current cell.

Such storage requirement and computation requirement may not be acceptable in certain situations. Accordingly, such requirements may be avoided in accordance with an aspect of the present invention.

A close examination of Equations (1) and (2) reveals that conformance time of a previous cell is not required under certain situations. For example, assume that the bucket interval of a current bucket being processed (for departure by a scheduler) is at least intercell time (T) prior to a present time (real time). In such a situation, the conformance time of the newly arriving cell is equal to the arrival time (i.e., present time according to the definition above). Therefore, the conformance time of the previous cell may not be required if the scheduler is backlogged by more than the intercell time (T) of a connection. Accordingly, the conformance time of previous cells need not be stored according to an aspect of the present invention.

In addition, assuming that the connections in a given group have intercell times (Ts) smaller than a maximum intercell time ($T_{max}$, corresponding to a connection with lowest shaping rate), the conformance time need not be maintained for cells in any buckets whose bucket interval is more than maximum intercell time prior to the present time. Cells in all such buckets may be placed in a different queue (frozen queue), and then scheduled for departure. The next cell in the same connection for any departing cell can be assigned a conformance time equal to the time of departure of the departing cell. Therefore, the conformance time of cells in the frozen queue need not be stored. Accordingly, the processing and memory requirements can be minimized when cells are backlogged in the internal queues (typically during congestion periods).

According to another aspect of the present invention the shaping rate of a shaped connection or the bandwidth allocated to a non-shaped connection can be varied dynamically. In the case of shaped connections, the intercell time (T) is changed to reflect the new shaping rate and conformance time of all cells on a corresponding connection queue (not yet placed in a bucket) is computed using the new intercell time. Cells are placed in buckets (possibly in new groups) and transmitted according to the conformance time computed using the new intercell time. Out-of-sequence delivery problems are avoided as only the head cell (first cell awaiting transmission) of each connection is placed in a bucket. Accordingly, the connection is shaped with the new (changed) shaping rate.

For non-shaped queues the bucket gap is changed to correspond to the new bandwidth. All subsequent cells are placed in buckets (potentially in a different group) to reflect the new bandwidth. Cells are scheduled for transmission as in the framework described above.

According to another aspect of the present invention, a scheduler provides for efficient transmission of a sequence of cells forming a frame. The sequence of cells includes a first cell of the frame, a last cell, and several intermediate cells. A scheduler waits until the last cell is received before transmitting any of the sequence of cells.

Such waiting in an intermediate switch of a connection path provides for efficient transmission of frames on ATM networks because the buffering requirements in subsequent switches in the connection path may be minimized. In addition, the drop policy may be simplified because all cells can be dropped if desired.

Waiting for the last cell of a frame provides other advantages as well. A switch with such a waiting can be extended to support ports (e.g., a port interfacing to an Ethernet network) which require the transmission of a complete frame. Transmission of a complete frame is required in switches which provide interface to networks (or systems) which operate using frame as a basic unit of transmission. Accordingly, it may be easier to extend any switch in a network as an end-switch interfacing with networks using a frame as a unit of transmission.

Also, the transmission of frames also is integrated with the framework described above. The first cell of a frame is placed in a scheduling bucket only after the last cell is received, and all the cells for the frame are transmitted in successive turns allocated to the bucket group immediately after the first cell is scheduled for transmission.

Even though cells of a frame are transmitted in quick succession, fairness can be maintained at a macro level among connections serving frames by adjusting the bucket gap taking into account the bandwidth requested for the connection and the number of cells transmitted for a frame. That is, the first cell of the next frame can be placed a number of buckets farther from the current bucket proportional to the number of cells transmitted divided by the desired bandwidth for the connection. In an alternate embodiment, the bucket gap is made proportional to the average intercell time of the connection and the number of cells transmitted is ignored to save processing time.

Therefore, the present invention provides for an integrated scheme to schedule cells fairly while providing for shaping, transmission of frame, and dynamic change of shaping rates and bandwidths.

The present invention supports shaping while minimizing storing and processing requirements, particularly during periods of congestion in a switch. This is because of the recognition that the conformance time of previous cells need not be used when there is substantial backlog in transmitting cells which have already arrived on connections.

Also, the present invention allows the shaping rate of a shaped connection to be dynamically changed. This is achieved by computing conformance time of unscheduled cells using a intercell time corresponding to the new shaping rate.

Further, the present invention allows the desired bandwidth of non-shaped connections to be dynamically changed. This is achieved by computing the intercell time corresponding to the new desired bandwidth, and placing subsequent cells in buckets corresponding to the computed intercell time.

In addition, the present invention allows efficient transmission of a sequence of cells forming a frame. This is accomplished by buffering all of the sequence of cells until the last cell of the sequence is received in the switch, and then scheduling for transmission the cells for transmission in successive transmission turns provided to the bucket group.

Also, fairness is maintained even though the sequence of cells forming a frame are transmitted in quick succession because the subsequent frame is scheduled for transmission taking into account the desired bandwidth for the connection and the number of cells transmitted for a frame.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1:
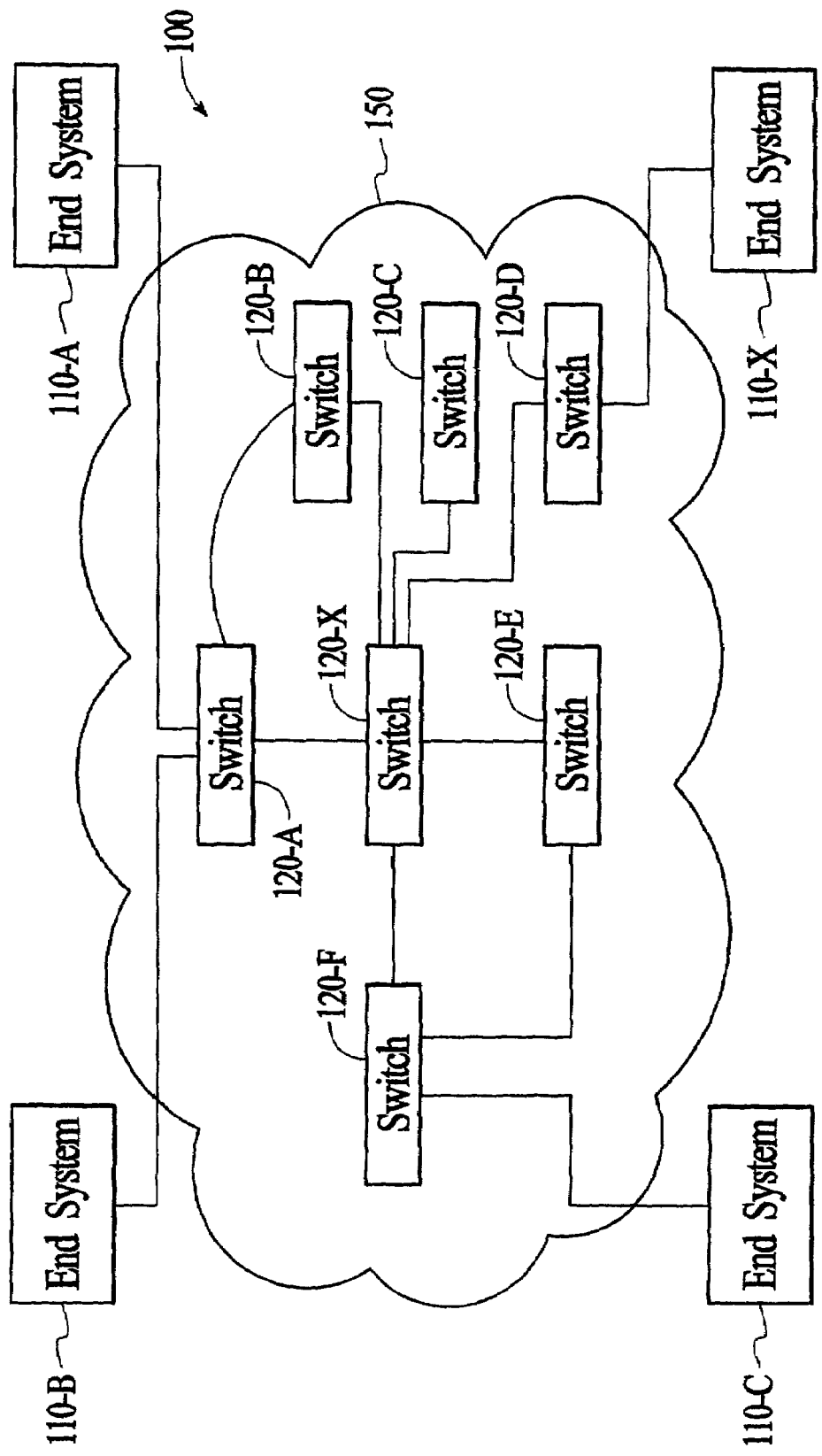
FIG. 1 is a block diagram illustrating an example environment in which the present invention can be implemented.

1. Overview and Discussion of the Invention

A scheduler in accordance with the present invention will be described with reference to communication network 100 of FIG. 1, which is a block diagram illustrating an example environment in which the present invention can be implemented. Communication network 100 includes ATM network (backbone) 150 connecting end-systems 110-A, 110-B, 110-C, and 110-X. ATM network 150 includes ATM switches 120-A, 120-B, 120-C, 120-D, 120-E, 120-F, and 120-X. Collectively or individually the end-systems will be referred by reference numeral 110 as will be clear from the context. Similarly, switch 120 will refer to either one of the switches or to the group as a whole.

For purpose of illustration only, a simple communication network environment is depicted in FIG. 1. In reality, communication networks can include several thousands of end-systems. As used in the present application, an end-system refers to any system connecting to a switch of a communication network 100 according to a pre-specified protocol. Examples of such end-systems include, but not limited to, ATM routers of data networks (which aggregate traffic from several computer systems), PBXs of voice networks (which aggregate traffic from several telephone systems), and a computer system which communicates directly with an ATM switch. Similarly, ATM network 150 can also include several thousands of switches 120. In fact, ATM network 150 can span several networks, in turn connected by switches.

A scheduler in accordance with the present invention can be implemented in one or more of switches 120. Several aspects of the present invention can be better appreciated with an understanding of the logical flow of cells in an example switch. Accordingly, the logical flow of cells in an example switch is explained below.

2. Logical Flow of Received Cells in an Example Switch

Broadly, ATM switch 120 receives a cell with a given VPI/VCI value on a port, and transmits the cell contents on one or more ports, depending on whether the cell is a unicast cell or a multicast cell. The details of ATM only as may be relevant to the present invention are described here. For a more detailed understanding of ATM standard, the reader is referred to a book entitled, "ATM: Theory and Application", (ISBN: 0070603626, Published September 1994 by McGraw-Hill Series on Computer Communications), by David E. McDysan and Darren L. Spohn, which is incorporated in its entirety herewith.

Figure 2:
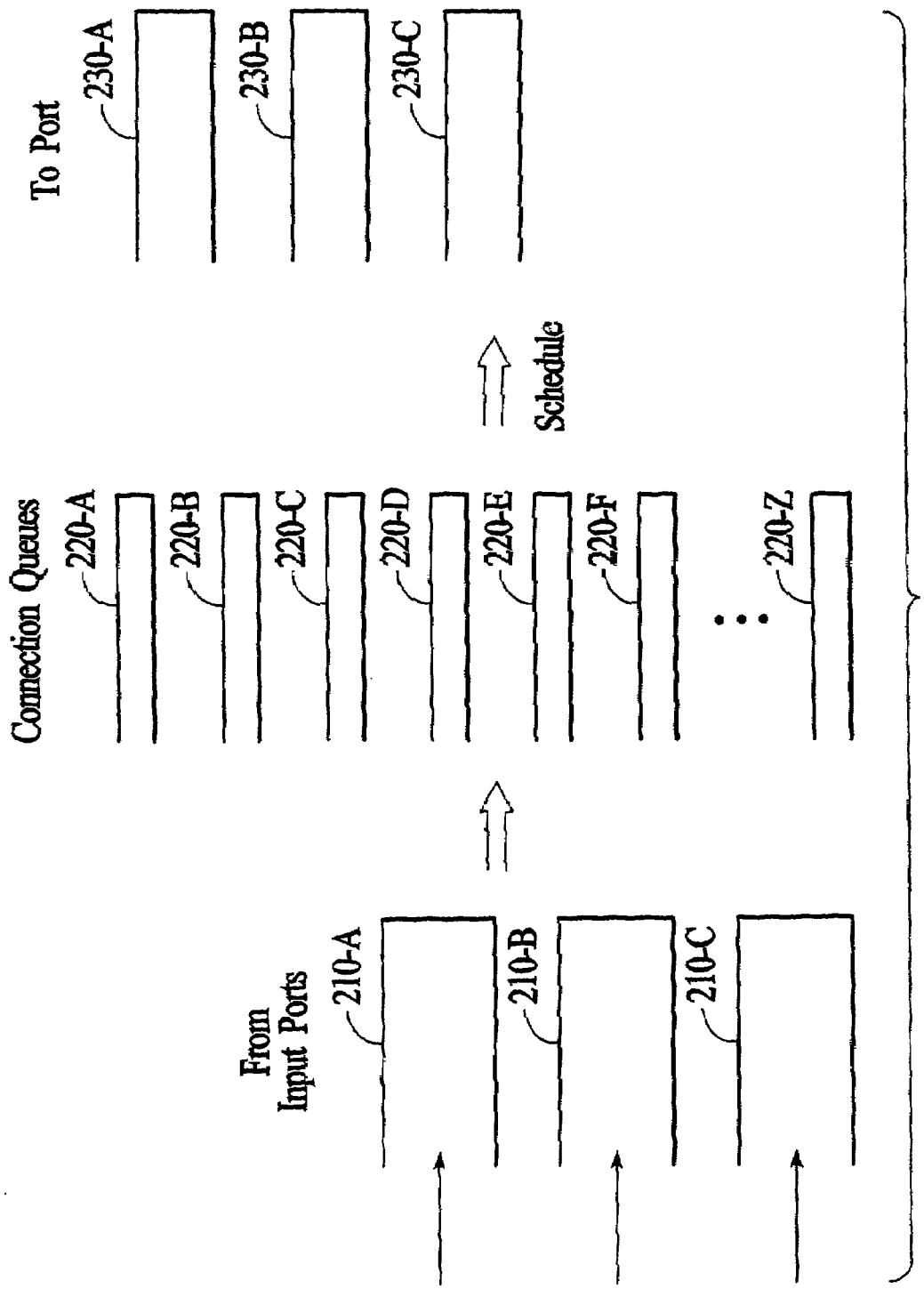
FIG. 2 is a diagram illustrating the logical flow of cells in an example environment of the present invention.

The logical processing or flow of the received cells will be explained with reference to FIG. 2. Cells are received on input ports 210-A, 210-B and 210-C, collectively or individually referred by numeral 210 as will be clear from the context. The received cells are placed in branch queues 220-A through 220-Z referred to by numeral 220. The representation of branch queues 220-A usually includes information to indicate the order ("cell order") in which cells for the corresponding connection are received.

A branch queue may be treated as a connection queue when a corresponding connection is a unicast connection. The present invention will be described mostly in the context of unicast transmissions. Accordingly, the word 'connection' will be used synonymously with 'branch' in the present application. The manner in which branch (connection) queues are managed in one or more embodiments is explained in further detail in RELATED APPLICATION 1. However, a different manner of management of queues can be chosen without departing from the scope and spirit of the present invention.

A scheduler schedules for transmission cells in branch queues 220 in accordance with the present invention. The scheduled cells are transmitted on output ports 230-A through 230-C referred to by numeral 230. The scheduler can schedule cells in different connection queues differently to provide various features in accordance with the present invention as explained below in detail. As a result of such different processing, the cell order may not be the same as transmission order when cells from several connections are considered in the aggregate. However, the cell order and the transmission order are maintained the same for the cells of a given connection (branch).

Using the ability to schedule cells in different connections differently, cells of each connection can be transmitted to achieve features specific to each connection. As explained below, each connection can be either shaped or non-shaped. In addition, connections can be shaped while minimizing additional memory and processing requirements. Also, the shaping rate for shaped connections and desired bandwidth for non-shaped connections can be dynamically changed. Further, the sequence of cells forming a frame are transmitted only after all cells forming the frame are received at a switch to enhance the overall efficiency and flexibility of the ATM network 150. All these features can be attained in a single framework while maintaining fairness in allocation of bandwidth to individual connections. The manner in which these features can be attained in accordance with the present invention will be described with reference to an example switch 120 of FIG. 4.

3. Example Implementation of an ATM Switch According to the Present Invention

Figure 4:
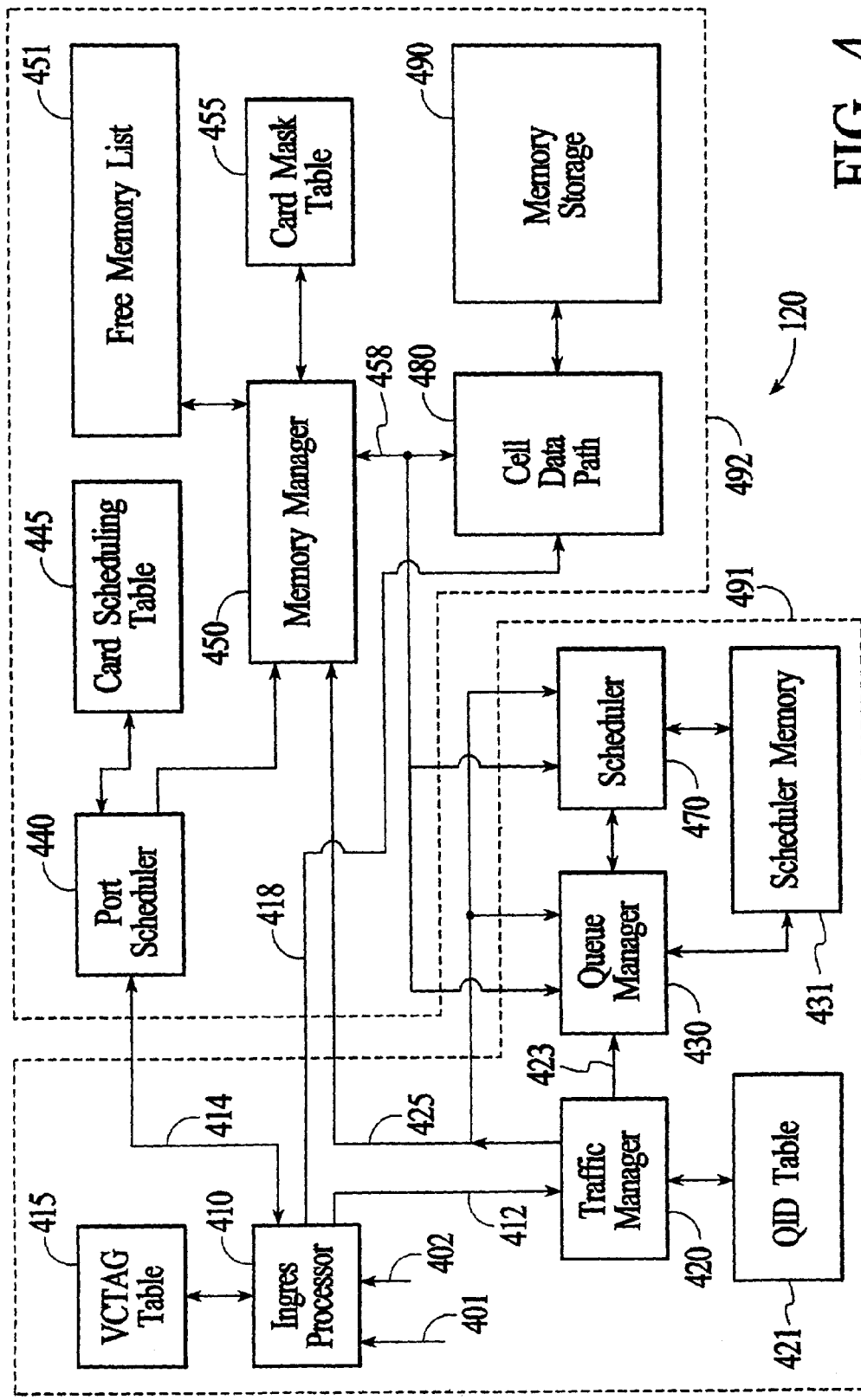
FIG. 4 is a block diagram illustrating an example implementation of a cell switch in accordance with the present invention.
Figure 5B:
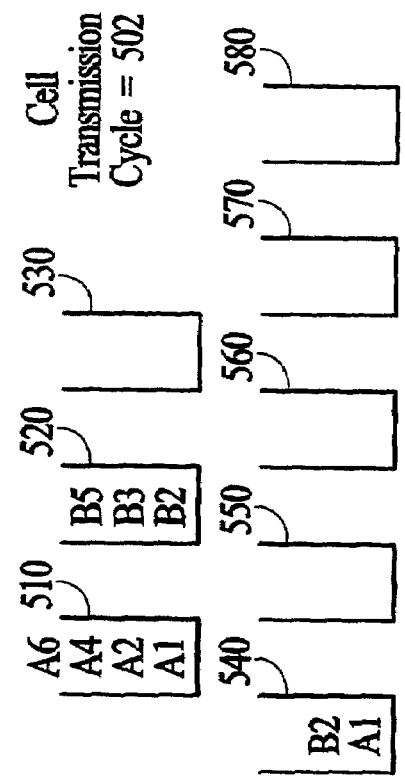
FIGS. 5A–5D are diagrams illustrating the status of connections and buckets as cells are scheduled for transmission in an embodiment of the present invention.
Figure 5D:
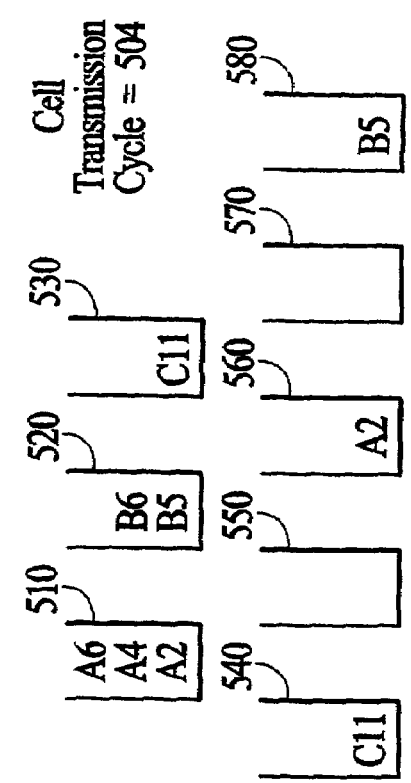
Figure 5A:
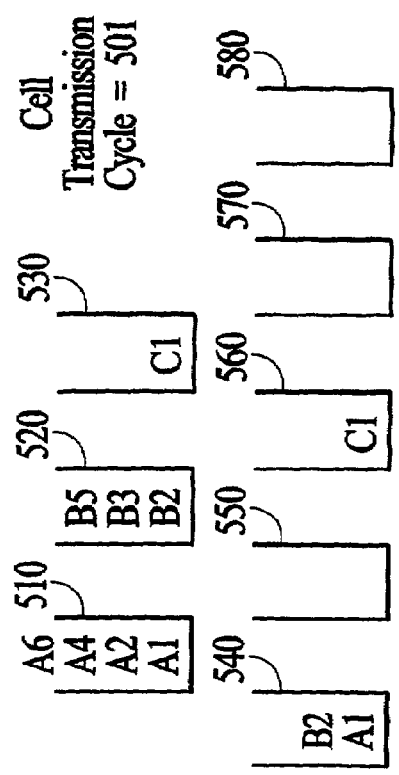
Figure 5C:
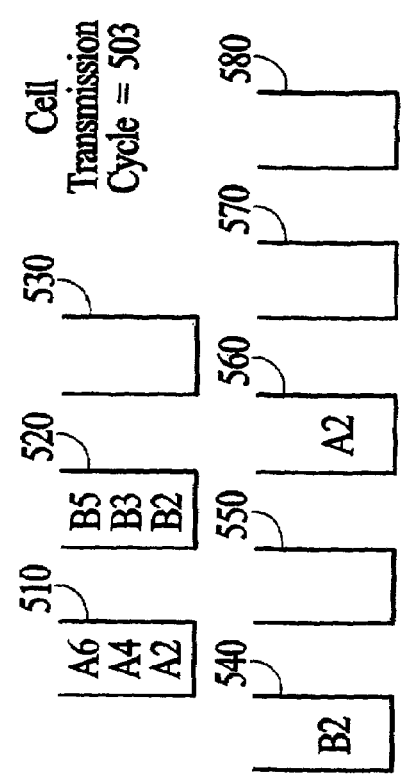

FIG. 4 is a block diagram illustrating an example implementation of switch 120 including a scheduler in accordance with the present invention. The scheduler will be described as being dedicated to a few ports in a port card. However, it should be understood that the present invention can be implemented with other types of switches such as those with a more centralized scheduler.

Switch 120 includes port card 491 and central block 492. Port-card 491 includes a few ports, with each port sending and receiving cell data. In the embodiment(s) described here, ingress processor 410, traffic manager 420, queue manager 430 and scheduler 470 are shown provided within (or dedicated to) port-card 491. Port scheduler 440, memory manager 450, cell data path 480 and memory storage 490 are shown in central block 492. The components in central block 492 coordinate the operation of components in all the port cards. Each component block of switch 120 is explained in detail below.

Ingress processor 410 receives ATM cells according to a pre-specified protocol on lines 401 and 402 from individual ports (not shown). In one embodiment, the cells are received using UTOPIA protocol known well in the industry. According to this protocol, information is received as to which port a corresponding cell is received on. The received port and VPI/VCI information in a cell are used to identify the input multicast connection. The input multicast connection is identified by VCTAG. VCTAG table 415 stores the information necessary for determining the VCTAG for a received cell based on VPI/VCI and port information. When a new connection is opened, ingress processor 410 updates the information in VCTAG table 415. Ingress processor 410 determines VCTAG corresponding to each received cell by examining VCTAG table 415.

Ingress processor 410 transmits the VCTAG information to traffic manager 420 on bus 412 when scheduled to do so by port scheduler 440. Such scheduling is usually necessary because ingress processor 410 may broadcast VCTAG information to all traffic managers in switch 120, and the bus used for the broadcast may be shared by all ingress processors. In addition, the frequency of examining a port is dependent on the aggregate bandwidth configured for the port. The bandwidth information is stored in card scheduling table 445. Card scheduling table 445 may include information necessary for egress processing as well. Thus, based on the data in card scheduling table 445, ingress processor processes the data received on lines 401 and 402. Ingress processor 410 transmits cell data (including header and payload) to data path 480 on bus 418.

Traffic manager 420 receives the VCTAG information on bus 412 and translates the VCTAG into a QID (queue identifier) by examining QID table 421. QID table 421 stores information corresponding to only the branch queues served by port-card 491. QID uniquely identifies the physical queues maintained by switch 120. In one embodiment, VCTAG is represented by more number of bits than QID, and each VCTAG is mapped to a unique QID. Traffic manager 420 may perform other functions such as determining whether to drop or accept cells.

Upon a determination to accept a cell, traffic manager 420 sends an indication of acceptance to memory manager 450 and queue manager 430 on bus 425. Traffic manager 420 further sends the associated port-card mask to queue manager 430 on bus 423. Queue manager 430 maintains the branch queues including the cells ready for transmission. Scheduler 470 processes the branch queues and cooperates with memory manager 450 and queue manager 430 to ensure that memory space in memory storage 490 is freed as described in further detail in RELATED APPLICATION 1, which is incorporated in its entirety herewith.

Memory storage 490 is used to store cell data. In one embodiment, memory 490 is implemented using a sync SRAM, with each memory word being capable of storing one cell. Cell data path 480 stores and retrieves the cell data in memory storage 490. The address of a cell, where a received cell data is to be stored, is provided by memory manager 450. Cell data path 480 provides other input/output functions such as retrieving the cells in advance so that the data is available when scheduled for transmission on individual ports. Queue manager 430 manages the queues for each branch (or connection in case of a unicast transmission). Queue manager 430 provides the information necessary for scheduler 470 to determine the ports on which (cells of) each branch queue needs to be transmitted, enabling scheduler 470 to schedule the cells for transmission on individual ports. Queue manager 430 further indicates whether any pending cells (or completely assembled frames) are present in each branch queue. An embodiment of queue manager 430 is described in detail in RELATED APPLICATION 1, which is incorporated in its entirety herewith.

Scheduler 470 schedules the cells in each branch queue in accordance with the present invention. Scheduler 470 schedules cells in connections fairly while enabling several other features specific to each connection. For example, scheduler 470 allows any desired connection to be shaped and the shaping rate can be varied dynamically. In addition, scheduler 470 allows for efficient transmission of cells forming a frame in all of ATM network 150. The manner in which scheduler 470 provides these features in one or more embodiments is described below in detail. Further scheduler 470 cooperates with queue manager 430 to ensure cells are deleted once the cells are transmitted on the desired branch (es). In the present application, fairness will be described with reference to allocation of bandwidth proportional to the bandwidth with which each connection is setup with. However, fairness can be implemented with other features such as priorities as will be apparent to one skilled in the relevant arts by reading the description herein.

Memory manager 450 keeps track of the free locations available for storing the received cells. Free-list memory 451 is used to store the necessary information. In one embodiment, the free-list is maintained as a linked list. A head pointer and a tail pointer are maintained, with the tail pointer being updated each time a free location is added and the head pointer being updated when a free location is provided for storage of a newly arrived cell. This maintenance scheme will be apparent to one skilled in the relevant arts by reading the description herein.

Memory manager 450 determines an address for storing newly arriving cells if an acceptance signal is received from any traffic manager 420. As noted above, the address is used by cell data path 490 to store the cell data, by queue manager 430 to maintain queues, and by scheduler 470 to schedule cells in each of the queues. Memory manager 450 maintains information identifying all traffic managers (in switch 120), which have indicated acceptance of a received multicast cell. This information may also be stored as a card mask for each multicast cell in multicast table 452. Card mask for each multicast cell is updated upon receiving an acceptance signal for the corresponding cell from each traffic manager. Once all the card ports indicated by the card mask send a completion signal (message), memory manager 450 updates the free-list memory 451 to indicate the availability of the memory location storing that given cell. In the case of a linked list implementation, the freed location is added to the tail of the free memory list.

Thus, switch 120 is described as having several component blocks, with each block performing certain functions. However, it should be understood that the functions are described with reference to each block for illustration purpose only, and some of the functions can be varied among the blocks as will be apparent to one skilled in the relevant arts based on the description herein. For example, the maintenance of port masks can be performed by traffic manager 420 instead of queue manager 430

Also, even though the components of FIG. 4 are shown either as dedicated or shared (port cards), it should be understood that the central functions can be more distributed, and some of the dedicated functions can be centralized depending on the available technologies, price/performance goals etc. For example, the card mask and port mask can together be implemented as a single mask, with each mask identifying all the branches in switch 120 on which a cell needs to be transmitted. Similarly, the pointers identifying the cell order can also be maintained centrally (as opposed to at each queue manager 430).

Thus, switch 120 forwards the received cells according to the scheduling schemes employed in scheduler 470. The scheduling scheme provides various features in accordance with the present invention as described below. As noted above, the connections are scheduled fairly. That is, the bandwidth available on a port is distributed consistent with QoS parameters associated with each connection. Assuming equal priority, bandwidth is distributed proportionate to the desired bandwidth for each connection. In one embodiment, fairness is achieved by using a hierarchical scheduling scheme. However, it should be understood that several aspects of the present invention can be implemented with other types of scheduling schemes as well. The hierarchical scheme in one embodiment is described below first.

4. Hierarchical Scheduling

Figure 3:
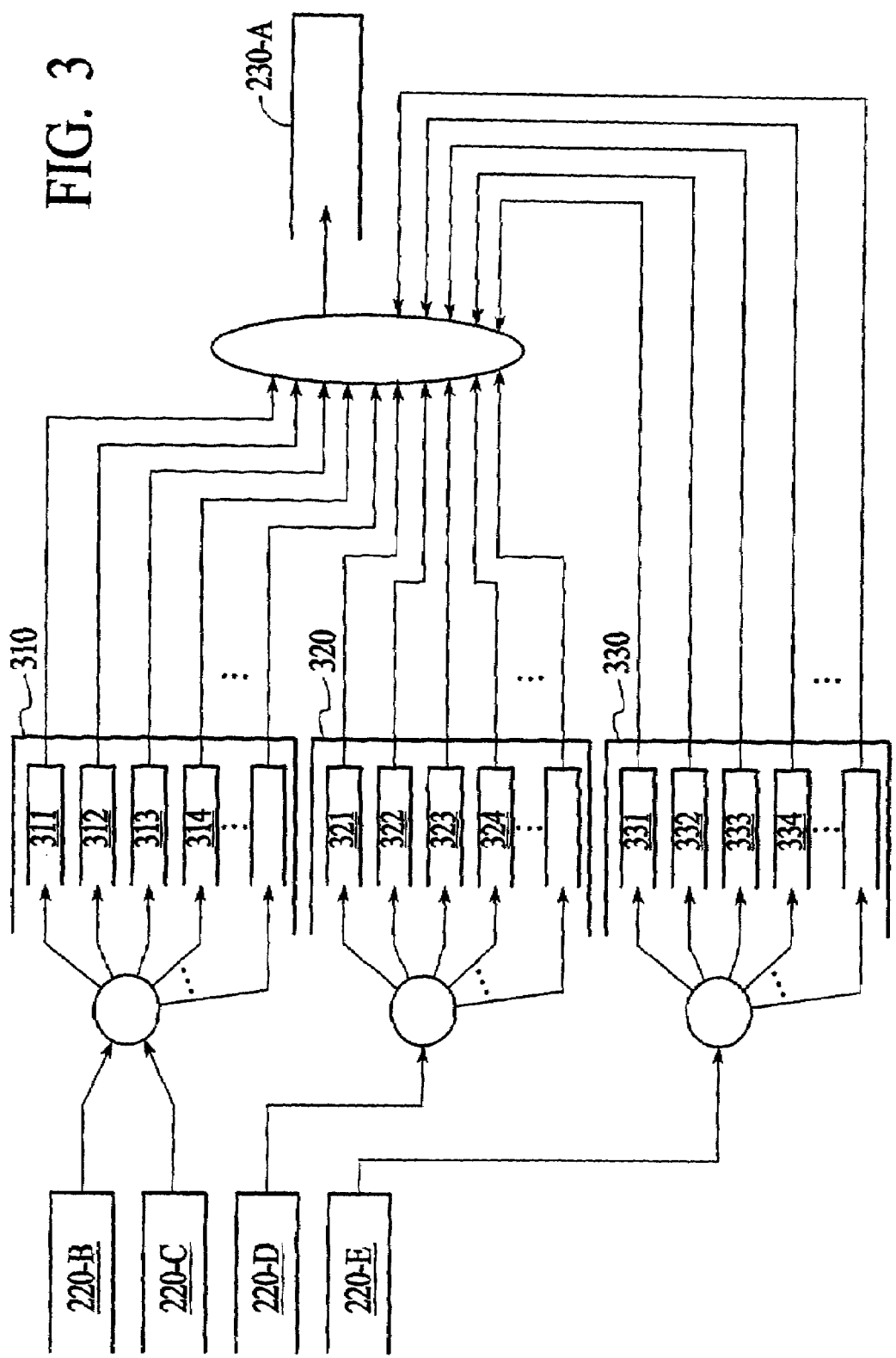
FIG. 3 is a diagram illustrating the flow of cells as scheduler schedules the cells in one embodiment of the present invention.

The manner in which fair scheduling can be achieved using hierarchical scheduling is described with reference to FIG. 3. FIG. 3 includes three groups 310, 320 and 330 of scheduling buckets. As will be described below, scheduler 470 places cells in buckets to define the relative departure times of cells within a group. The farther a cell is placed from a current bucket, the later the cell is likely to be transmitted. A current bucket refers to the present bucket from which cells are being selected for transmission. Also, multiple cells can be placed in a bucket and the cells in a bucket are processed in a FIFO (first-in-first-out) order. The FIFO order can be implemented using a linked list as will be apparent to one skilled in the relevant arts.

As an illustration, group 310 is shown with scheduling buckets 311, 312, 313, 314 etc. The scheduling scheme of FIG. 3 is dedicated to a single port of a switch. A similar scheduling scheme can be implemented for other ports as well. Even though only three groups and a few buckets in each groups are shown here for conciseness, a typical port may have several associated groups and several buckets within each group.

The scheduling of a cell under the hierarchical scheduling scheme of FIG. 3 entails two hierarchical steps: (1) Determining a group, and (2) determining a bucket in the determined group with a cell ready for transmission. The general considerations underlying the group selection and bucket selection will be clear from the description below. Only two levels of hierarchy are described here for simplicity. However, a different number of levels of hierarchy can be implemented without departing from the scope and spirit of the present invention as will be apparent to one skilled in the relevant arts by reading the description herein.

By having different groups, the scheduler of the present invention can provide different priorities and other features to different connections as will be further clear from the description herein. For example, different groups can serve connections requiring different bandwidth ranges and provide different features such as shaping and frame processing in each group. As an illustration, one group can be dedicated to connections setup with bandwidths in the range of few Kbps to a few Mbps, while another group can be setup to handle bandwidths in the range of few Mbps (e.g., T1) to hundreds of Mbps.

Yet another group can be setup to handle connection transmitting cells of frames. One of the groups (e.g., group transmitting frames) can be given a guaranteed a minimum amount of bandwidth, but be provided the use all the port bandwidth not used by other groups. There can be several groups serving the same bandwidth range, but providing for other features such as shaping and efficient processing of cells of a frame. Examples of groups providing such features are explained below in detail.

In one embodiment, bandwidth is allocated among groups (or each group is selected) using self clocked fair queuing method (SCFQ). In SCFQ, each group is assigned a weight and the cells in the groups are allocated an aggregate bandwidth proportional to the assigned weight. For example, assuming groups 310, 320 and 330 are assigned weights of 1, 2 and respectively, the groups are allocated ⅛, ⅜ and ⅝ (where 8 is the sum of the assigned weights) of the available bandwidth on the port. The cells from the groups are typically interleaved in transmission while attempting to maintain the proportional bandwidth allocated to the respective group. Thus, a group can be selected using one of several schemes such as SCFQ as a first step in the hierarchical process.

As a second step of the hierarchical process, a bucket with a cell ready for transmission is selected. The selection of a bucket will be clearer from a description of the overall processing of cells using buckets in a group. The manner in which cells are placed in buckets and transmitted can vary depending on whether a connection is shaped or nor shaped. The manner in which non-shaped connections are processed in a bucket is described first with reference to FIGS. 5A through 5D. Processing cells in shaped connections is described later.

5. Processing Cells in a Non-Shaped Connection

FIGS. 5A, 5B, 5C and 5D illustrate the status of the non-shaped connection queues 510, 520, 530 and buckets 540, 550, 560, 570 and 580 during successive cell transmission cycles. A cell transmission cycle of a group refers to a turn allocated to the group, during which a single cell can usually be transmitted. As noted above, the turns for the groups may be interspersed while maintaining proportional bandwidth allocated to the respective group.

Associated with each non-shaped connection is a bucket gap, preferably expressed as the number of cell transmission cycles for the group. The bucket gap is inversely proportional to the bandwidth of the corresponding branch. The bucket gap is used to choose how many buckets away from a current bucket the next cell in a connection queue is to be placed. As such number of buckets is made larger, the cells of the branch are transferred at a lower frequency. That is, as the bucket gap of a branch is larger, the branch is likely to be allocated less bandwidth. It should be noted that the bucket gap for a connection can change if the connection is assigned to a different group.

For illustration, branches 510, 520 and 530 are assumed to have bucket gaps of 2, 4, and 3 respectively. Only the head of queue cell (head cell) of each connection may be placed in a bucket to ensure that the connections receive bandwidth proportional to the desired bandwidth for the connection. As described below, scheduling only the head cell provides additional advantages with respect to dynamic change of shaping rates also. Thus, at cell transmission cycle=501 in FIG. 5A, cells A1, B2, and C1 represent the head cells of connections 510, 520, and 530 respectively. Cells A1 and B2 are shown placed in bucket 540 and cell C1 is shown placed in bucket 560.

Associated with each group is a current bucket (the currently served bucket). All cells in the current bucket are read before considering cells in subsequent buckets for transmission. Assuming bucket 560 is the current bucket, cell C1 is read first. As there are no other ready cells in bucket 560, the subsequent buckets are considered.

As buckets 570 and 580 are empty (and as bucket are considered circular sequence), the next non-empty bucket 540 is considered the current bucket at cell transmission cycle=502. The first cell A1 in bucket 540 is read during cell transmission cycle=502 and the next cell B2 in bucket 540 is read during next cycle of cell transmission cycle=503. When a cell is received in an empty branch queue, the received cell may be placed in a bucket corresponding to bucket gap of the connection away from the current bucket. Thus, cell C1 received at cell transmission cycle=504 is placed three buckets away from current bucket 560.

While the head cell of a connection is scheduled for transmission from a bucket, the next cell of the connection (if available) is placed in an appropriate bucket according to the bucket gap of the connection. Thus, when cell A1 of connection 510 is transmitted during cell transmission cycle=502, the next cell A2 of connection 510 is placed two buckets away (i.e., bucket gap of connection 510) in bucket 560. Similarly, when cell B2 is read during virtual time=503, the next cell in connection 520 is placed four buckets away from the current bucket in bucket 580.

By using the scheme of above, bandwidth provided to a group can be distributed according to the bucket gap (or bandwidth) of the non-shaped connections. That is, the scheduling is fair across different connection. Even though the bucket gap of above is described as a whole integer, it should be understood that bucket gaps can be represented at finer precision to provide for more accurate distribution of bandwidth as requested for the connections. In one embodiment, each branch queue (510, 520, and 530) is characterized by a group number, a bucket gap, and a bucket sub-gap.

Sub-gaps enable a more precise distribution of group bandwidth among branches (connections). Assume for illustration that sub-gap is represented by five bits (32 intercell times), and a branch is assigned a bucket gap of 2 and a bucket sub-gap of 4. Generally, a next cell of the connection is placed 2 buckets away from a current bucket. However, every eighth cell is placed 3 buckets away taking into account that sub-gap 4 represent $4/32 (=1/8)$ of the gap. In essence, the effective bucket gap may be viewed as $2+4/32=2\frac{1}{8}$, and the fraction is ignored in selection of bucket for the next cell.

Thus, bandwidth available on a port may be distributed fairly among several non-shaped connections using a hierarchical scheme such as the one described above. The distribution of bandwidth among shaped connections provides different additional challenges as described below.

6. Shaping Connection in Accordance With an Aspect of the Present Invention

Shaping refers to the ability of switch 120 to restrict a connection to use less than or equal to a predetermined amount of bandwidth ("shaping rate"). The rate is generally computed based on a short interval (or time duration) to prevent flooding of the subsequent portions of the network in the connection path with the cells of the shaped connection. As should be apparent, if the cells are made to depart to average the connection bandwidth over an extended period of time, cells may depart in bursts at times, and at times no cells may depart. In general, schedulers attempt to prevent such type of bursty traffic patterns on shaped connections.

To ensure that a cell does not depart earlier than a time determined by the shaping rate, a conformance time is associated with cells of a shaped connection (branch). Conformance time typically refers to an earliest real time a cell may depart (or be transmitted), without being in violation of the shaping rate. The conformance time may be computed based on the (desired or actual) departure times of the prior cells (in the transmission or cell order) to ensure that the shaping rate is conformed to.

Thus, the departure time of the prior cells may be stored for each connection. A scheduler uses these departure times to determine the conformance time of a later cell, and ensures that the later cell does not depart earlier than the computed conformance time. However, storing departure times for all connections may consume excessive memory and require additional processing time to retrieve the departure times. The additional processing time may be particularly undesirable when switch 120 is congested with cells from several connections.

The need for storing (or using) the departure times of some previous cell(s) may be avoided in accordance with the present invention as described below. First, an example manner of computing conformance time of each cell is described. Then, the manner in which the conformance time can be used to shape connections, and how additional storage can be avoided is described.

7. Computing Conformance Time in an Example Implementation

In the description of a shaped connection here, a current cell will be denoted by "j" and the next cell in the cell order will be denoted by "j+1". The following other conventions will be used in the description herein:

C(j): Conformance time of a cell j;
E(j): Expected Arrival time of a cell j;
A(j): Arrival Time for cell j; and
T: Average intercell time for a queue for a desired shaping rate.

The manner in which the C(j) and E(j) of a cell are computed is explained in further detail below. Arrival time A(j) is measured by the (real) time when a cell is placed into a bucket from the connection queue for reasons explained below.

The conformance time of each cell is computed according to the following Equations:

$$C(j)=\mathrm{MAX}[E(j), A(j)] \quad \text{[Equation (1)]}$$

$$E(j+1)=C(j)+T \quad \text{[Equation (2)]}$$

Equation (2) in conjunction with Equation (1) ensures that consecutive cells are scheduled for transmission at least with an approximate interval of T. It should be understood that conformance time C(j) of a cell is chosen as the departure time of cell j. Ideally, cell j needs to depart at real time C(j), and C(j) may be termed as a desired departure (or transmission) time.

However, due to cells from other connections being ahead in the buckets or due to priority of the group, cell j may depart from buckets slightly later than conformance time. Therefore, the actual departure time of cell j may occur slightly later than conformance time C(j). Accordingly, A(j)

may be compared with $E(j)-\tau$ (where $\tau$ represents a tolerance level) in Equation (1). In one embodiment, $\tau$ is set to 0 which implies that no tolerance term is considered.

When a burst of successive cells is received or when the network is lightly congested, arrival time $A(j)$ may be expected to be less than the expected arrival time $E(j)$. In such situations, the expected arrival time $E(j)$ of Equation (1) operates to reshape the connection. That is, the transmission times between successive cells are controlled to achieve a desired shaping rate. As may be seen from Equation (2), the expected arrival time of a cell is equal to the conformance time of a previous cell plus the intercell arrival time of the queue. As Equation (1) is computed as a maximum (MAX) function, the conformance time (i.e., the transmission time) is ensured to be at least as much as the expected arrival time even when a burst of cells are received in quick succession. $A(j)$ of Equation (1) is selected as conformance time $C(j)$ when arrival time $A(j)$ is greater than expected arrival time $E(j)$. That is, when a cell arrives later than its expected arrival time (which itself is Intercell Time away from the conformance time of a previous cell), the cell conformance time is computed to be equal to the arrival time. In one embodiment, the arrival time is measured as the time when the cell is considered for placement in the buckets. The effect may be that shaping does not attempt to speed up late arriving cells even if they arrive later than the corresponding conformance time as will be clearer from the below description of selection of a bucket based on the conformance time.

The manner in which conformance time can be used to select a bucket and transmit cells in an example implementation is described below.

8. Using Conformance Time to Select a Bucket and Transmit Cells

Broadly, in one embodiment, a bucket in a group is selected first based on the conformance time. Note that the selected bucket corresponds to a bucket interval of real time including the considered conformance time. The selection of a bucket generally defines a logical transmission order of cells of all connections transmitted on a port. However, the exact time a cell's turn for transmission may arrive can be a very short duration or long duration (as measured in real time) after being placed in a bucket depending at least on the priority/bandwidth allocated to the group and the number of cells which may be ahead of the cell awaiting transmission in the buckets.

To meet the shaping requirement, scheduler 470 delays transmission of cells in a bucket at least until the real time equals the conformance time. Therefore, the conformance time is used not only to select a bucket, but also to ensure that the cell is transmitted only at or after the present real time reaches the conformance time of the cell as explained in further detail below with reference to FIGS. 7A and 7B.

The manner in which the conformance time is used for bucket selection in an example implementation is described first. Associated with a group of buckets supporting shaped connections is a bucket interval, measured in real time. A bucket interval covers a range of conformance times. A cell in placed in a bucket if the conformance time of the cell falls within the bucket interval. The bucket interval may be identified by a start time (e.g., in real time) coordinate and an end time coordinate.

In one embodiment, the cells within a bucket may be scheduled in a FIFO manner.

Accordingly, a linked list can be used to identify the order of arrival. Due to the FIFO order, as between two cells of different connections placed in a bucket, one cell may depart sooner than the other cell even if the conformance time of the one cell is later than the conformance time of the other cell provided the one cell is placed earlier in the bucket. However, the transmission order is maintained the same as the cell order within a given connection.

The effect of FIFO ordering within a bucket on shaping can be that a cell behind (behind cell) in the FIFO may have to wait until after the conformance time of a prior cell in the FIFO order is reached even if the conformance time of the behind cell is already reached. To minimize such undesirable waiting of cells which may be otherwise ready for transmission, the bucket interval may be short for large bandwidth groups and long for short bandwidth groups. It may be further noted that FIFO structure may be desirable in spite of such waits because of the minimal processing requirements in scheduling cells for transmission.

In the description here, it will be assumed that there is a large number of buckets. The physical buckets supporting such large number of buckets can be much smaller in number and used in a circular manner. A wrap count may be associated with each cell to indicate the 'round' number to which the cell belongs when physical buckets are used in circular manner. Such an implementation will be apparent to one skilled in the relevant arts based on the description herein. By using different groups for connections with low bandwidths and for connections with high bandwidths, the wrap count can be managed to be of manageable size.

Figure 7A:
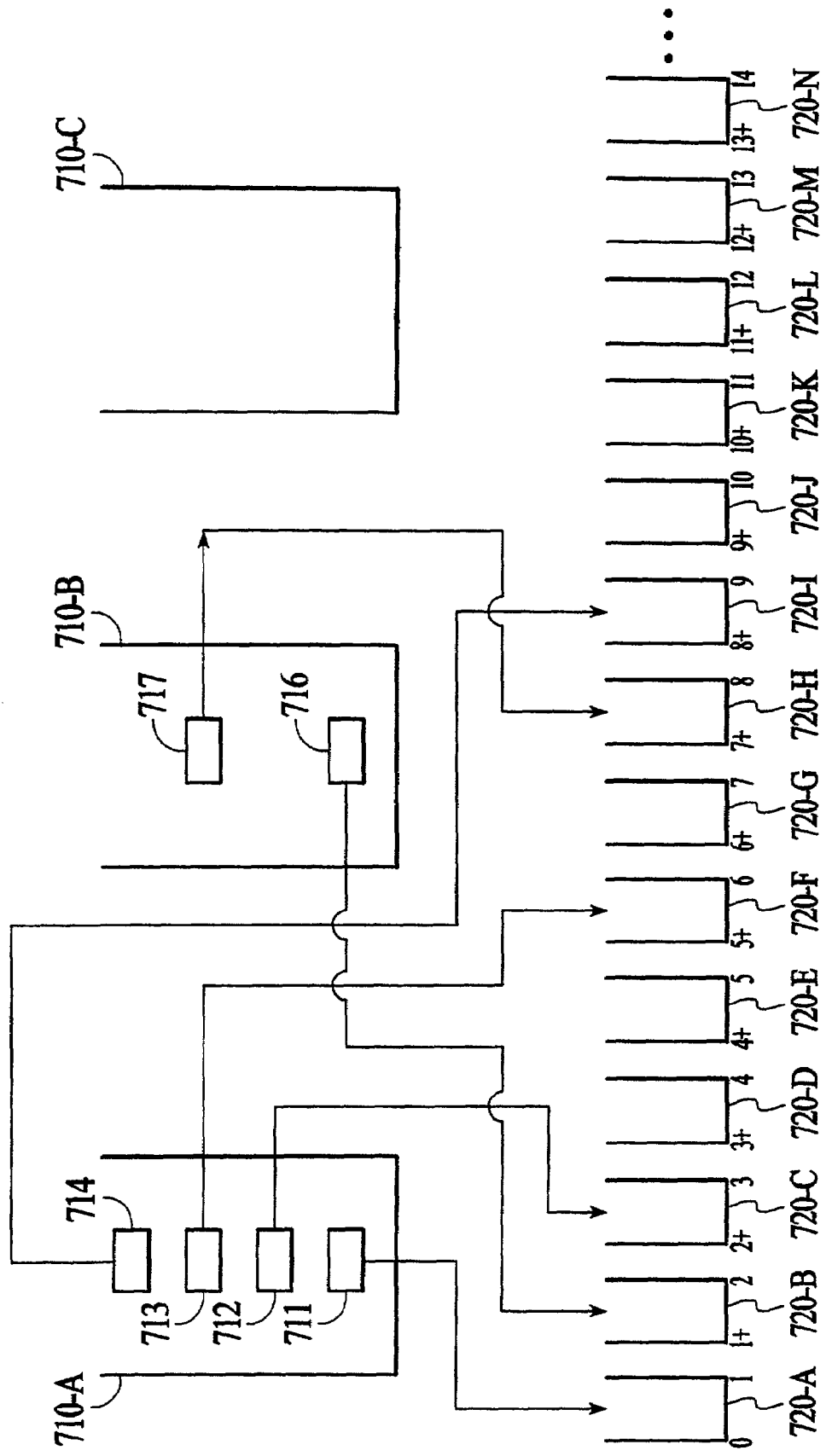
FIGS. 7A–7B are diagrams illustrating the manner in which connections can be shaped in an embodiment of the present invention.
Figure 7B:
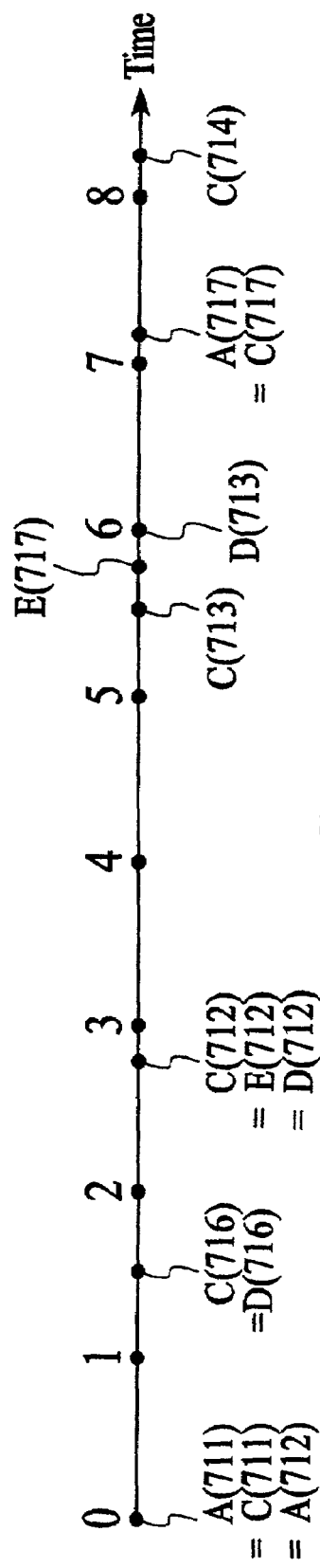

Bucket intervals and the manner in which conformance times are used for selecting a bucket are illustrated further with reference to FIGS. 7A and 7B. For illustration, assume that buckets in group 720 of FIG. 7A have a intercell time of 1 millisecond. The bucket intervals of adjacent buckets are contiguous. Thus, bucket 720-A represents an interval of 0–1 millisecond (MS), bucket 720-b represents an interval of $1^+$ ($1^+$ sign means than greater than one) to 2 milliseconds, and bucket 720-C represents a bucket interval of $2^+$ to 3 milliseconds etc.

Once the real bucket interval of each bucket is logically determined, the conformance time of each cell is examined to determine which bucket contains the time coordinate of the conformance time. As an illustration, assume that connection 710-A has an intercell time of 2.75 milliseconds of milliseconds, and that cells 711–714 are received on connection 710-A in a burst and awaiting scheduling. As described below, connection 710-A will be reshaped as the conformance time of each cell 711–714 is set equal to the expected arrival time $E(j)$ in Equation (1).

Assume first cell 711 has a conformance time of 0.0 milliseconds (because, for example, it is received when queue 710-A is empty), and accordingly cell 711 is shown placed in bucket 720-A having a bucket interval of 0–1 millisecond in real time. After cell 711 departs from bucket 720-A for transmission (at time=0.0 milliseconds), next cell 712 will be placed in bucket 720-C as the conformance time $C(712)$ is 2.75. Arrival time $A(712)$ is also equal to 0 because the arrival time is the time cell 712 is placed in bucket 720-C, which is when cell 711 departs. Accordingly, $A(711)=C(711)=A(712)=0$ is shown in the time line of FIG. 7B.

The expected arrival time $E(712)=0+2.75=2.75$ milliseconds, $A(712)=0.0$, and thus $C(711)=2.75$ per Equation (1) as also shown in FIG. 7B. Accordingly, cell 712 is placed in bucket 720-C. Even if scheduler 470 considers cell 711 for departure sooner than $C(711)=2.75$, cell 711 will not be allowed to depart until time 2.75 because the real present time has not yet reached 2.75. Assume cell 712 departs at present real time=2.75 as desired (shown as D(712)).

Cell 713 will be placed in bucket 720-F representing a bucket interval of $5^{+-6}$ as C(713) will be computed to be 5.5 (max of E(713)=5.5 and A(713)=0.3). Assume here that cell (713) does not depart until real time=6 (as shown in FIG. 7B by D(713)) either because group 720 does not have high priority or because of several pending cells in buckets 720-D and 720-E. However, the late departure may not change the conformance time of next cell 714, and cell 714 will have a conformance time of 8.25 and be placed in bucket 720-I. Cell 714 will be allowed to depart at or after real time of 8.25 by scheduler 470. Thus, scheduler 470 reshapes a connection when a burst of cells are received on a connection.

The effect of Equations (1) and (2) on cells arriving with large intercell arrival times is explained now. Assume for illustration that connection 720-B has an intercell time of 4.25 milliseconds and cell 716 has arrived at real time=1.5 into an empty queue. Accordingly, cell 716 has a conformance time of 1.5. Cell 716 is shown placed in bucket 720-B representing an interval of $1^{+-2}$ milliseconds. Cell 716 departs in due course.

Next cell 717 will have an expected arrival time E(j) of 1.5+4.25=5.75 milliseconds. Due to reasons such as delays up in the connection path, assume cell 717 arrives only at time coordinate 7.1 (i.e., A(717)=7.1 milliseconds). According to Equation (1), the conformance time C(717) is set to time coordinate 7.1. Therefore, cell 717 is placed on bucket 720-H. Cell 717 does not depart at least until conformance time 7.1 is reached in real time. It should be noted that cell 717 departs sooner than cell 714 even though cell 714 arrived earlier into the connection queues.

In one embodiment, time referred to by in the description with reference to shaped connections is measured (or kept track of) by the current bucket position (including a fraction with high precision). As real time elapses, the current bucket position is incremented proportionately. A next bucket for shaped connections is considered for transmission only after the current bucket position reaches a whole number equal to the number of the next bucket.

Accordingly, the intercell time may also be translated into bucket gap and sub-gap (as for non-shaped queues) by dividing the intercell time (T) by the bucket interval duration associated with buckets of a group. As a few physical buckets support several logical buckets, a wrap count may also be associated with each cell. The computations of conformance time, arrival time etc. may be performed in terms of bucket gap, sub-gap and wrap count. With this background, the buckets will be treated as being sequential and infinite. Such an implementation will be apparent to one skilled in the relevant arts by reading the description herein. As should also be apparent, the treatment of real time as a current bucket position enables easier integration of processing of shaped and non-shaped.

At least from the above description, it may be appreciated that a conformance time of a cell in the bucket may need to be maintained to determine the conformance time of the next cell to be scheduled. That is, the conformance of the last cell placed in a bucket may need to be stored for each connection. Unfortunately, the internal memory requirements may be excessive in such a scheme. In addition, scheduling a cell may require additional processing steps including retrieving and updating the conformance time from a memory. The processing steps may be undesirable, particularly when switch 120 has several pending cells in buckets. The storage and processing may be avoided in accordance with an aspect of the present invention as described below.

Figure 8:
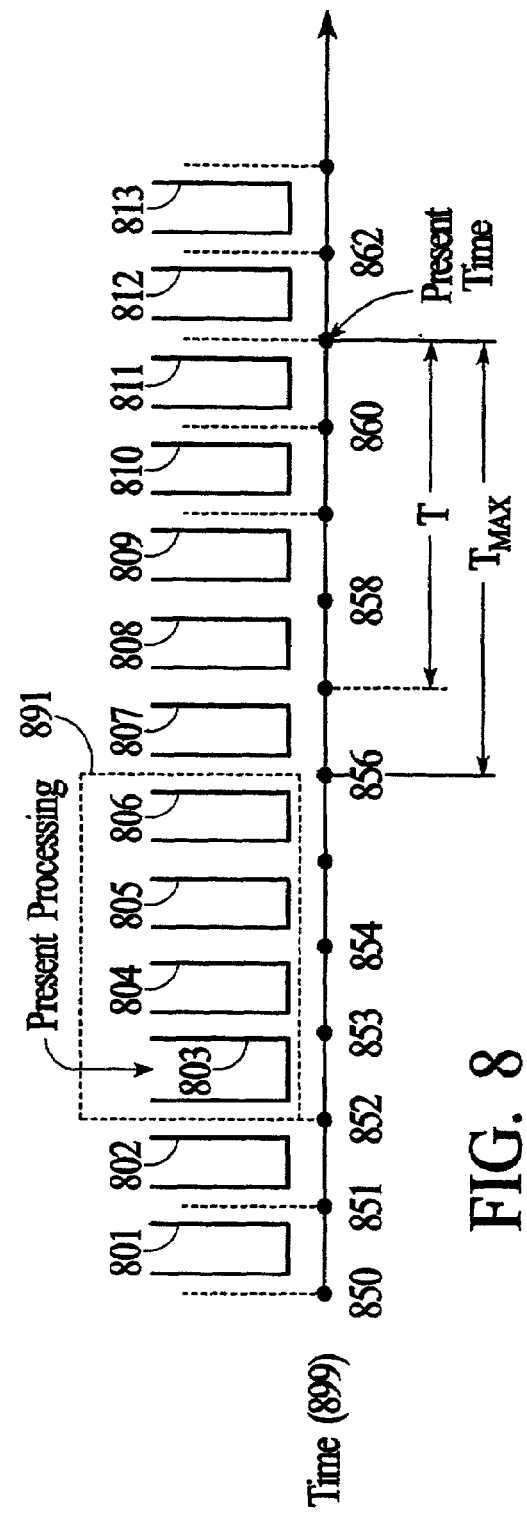
FIG. 8 is a diagram illustrating the manner in which storage and processing requirements can be minimized while shaping connections in accordance with the present invention.

9. Avoiding the Need to Store Conformance Time of Last Scheduled Cell for Each Connection The general idea will be illustrated first with reference to FIG. 8. As described above, each bucket group includes several buckets, with each bucket holding cells having a conformance time which falls within a bucket interval associated with the bucket. Buckets 801–832, each with an interval of one second duration, are shown in FIG. 8. Bucket 801 represents bucket interval having start time coordinate of $850^+$ seconds to start time coordinate of 851 seconds, bucket 802 represents $851^{+-852}$ seconds etc. Real Time Line 899 with real time coordinates shows the real bucket interval corresponding to each bucket.

For illustration, assume that cells in buckets 801 and 802 have been already processed. Scheduler 470 is shown to be processing cells in bucket 803 corresponding to bucket interval 852–853 seconds. Assume further that the present real time is 861. Therefore, but for the backlog, all cells in buckets 803–811 could have departed. When a cell of a connection departs from a bucket, scheduler 460 needs to place the next cell (if present in the connection queue) of the same connection in an appropriate bucket. As noted above, the conformance time of the departing cell may be used for computing the conformance time of the new cell.

However, a close examination reveals that if processing backlog is more than the intercell time of a connection, the conformance time is not needed to compute the conformance time of a later cell because the arrival time A(j) (measured as the time at which a cell is placed into the bucket) will be more than the expected arrival time in Equation (1) of above.

To further clarify, let us assume that intercell time of a subject connection is 4 seconds, and a cell (of the subject connection) in bucket 803 representing a real bucket interval 852–853 is departing for transmission. Assuming the conformance time of the departed cell is 852.5 seconds, the expected arrival E( ) of the next cell is 855.3. However, the arrival time A(j) defined to be equal to the present time is 861, which is greater than the expected arrival time E(j) of the next cell.

Therefore, it should be understood that the conformance time C( ) of a cell may not be needed for scheduling a subsequent cell of a connection if scheduler 470 has a backlog of more than the intercell time of the connection. The extension of this general idea to multiple connections is described now.

It should be noted that each connection can have a different intercell time to represent the shaping rate of the corresponding connection. Assuming that scheduler 470 only processes connections having at least a minimum bandwidth (or a maximum intercell time), it should be understood that the conformance time need not be stored for any cell in buckets representing bucket intervals which are more than the maximum cell interval ($T_{max}$) prior to the present real time.

For example, with reference to FIG. 8 again, assuming the maximum cell interval is 5 seconds and assuming the present time is 861, conformance time need not be stored for cells in buckets 803–806. All such buckets 803–807 (behind by more than the maximum intercell time from the present real time) may be termed as 'frozen buckets' 891. The buckets between the present time and {present time–maximum intercell time} 807–811 may be termed as 'shadow buckets'.

Therefore, scheduler 470 may logically organize all cells in frozen buckets in a queue (frozen queue 891). As each cell departs, scheduler 470 places the next cell in the corresponding connection in a bucket corresponding to the present real time. Continuing with the above example, a cell would be placed in bucket 812 assuming the present time is at least 861+. It is noted that 861+ represents the conformance time of this cell according to Equations (1) and (2) above. Once cells are placed in buckets with a corresponding conformance time, the cells are transmitted in due course, for example, as explained above. Hence, conformance times need not be stored for the cells in the frozen queues 891. Particularly in congested conditions, when the schedulers may be expected to be backlogged, the memory savings can allow a switch to process more connections. Such ability may be important for switches in hub-positions (e.g., 120-X in FIG. 1). Also, the processing requirements are also reduced as scheduling subsequent cells may not require retrieval and update of the conformance times. Therefore, the processing throughput of switch 120 can be enhanced in accordance with the present invention.

It may also be noted that the conformance time of the last cell before a connection becomes idle (i.e., a cell being scheduled for transmission from a bucket without a subsequent cell in the connection queue), may need to be stored for scheduling a subsequent cell. Other aspects of the present invention are described below.

10. Dynamic Change of Shaping Rate

The shaping rate of a connection can be changed dynamically in accordance with another aspect of the present invention as illustrated with reference to the flow-chart of FIG. 6. The shaping rate may be changed, for example, in response to congestion levels, which may vary over time in a network. In one embodiment, the congestion level in a communication path is determined using the available bit rate (ABR) service of ATM networks, and the shaping rate is increased if the network is not congested and decreased if the network is congested.

Figure 6:
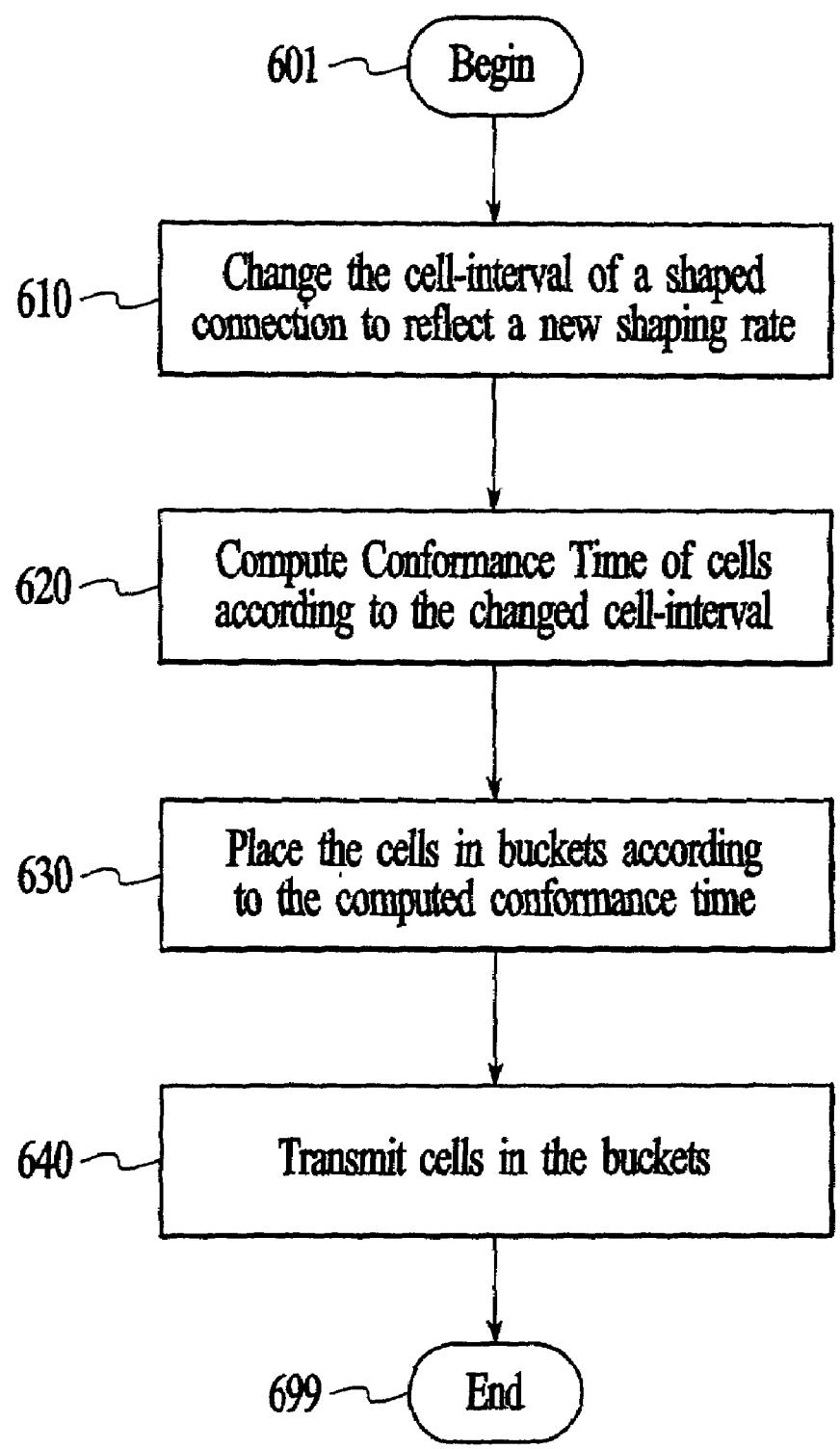
FIG. 6 is a flowchart illustrating the steps performed to dynamically change the shaping rate in accordance with the present invention.

In step 610 of FIG. 6, the intercell time is changed to reflect the new shaping rate. As noted above, the intercell time is inversely proportional to the shaping rate. In step 620, when scheduling cells (e.g., from connection queues to buckets) the conformance times of new cells are computed based on the changed intercell time (T). Equations (1) and (2) of above can be used to compute the conformance time.

In steps 630 and 640, the cells are transmitted according to the conformance time computed in step 620. For example, in step 630, the cells may be placed in a bucket according to the conformance time as described above. In step 640, the cells in the buckets may be transmitted, for example, according to the scheme described with reference to FIG. 8 above. As only one cell of a queue is placed in the buckets in the example implementation of above, issues such as out-of-sequence delivery may not be present even if the shaping rate is dynamically increased.

Thus, the shaping rate can be changed dynamically in accordance with an aspect of the present invention. The desired bandwidth allocated to a connection can also be varied in accordance with the present invention. The bucket gap is recomputed to correspond to the changed desired bandwidth, and cells are scheduled for transmission using the computed bucket gap as described above.

A sequence of cells forming a frame are forwarded for efficient transmission down the connection path as described below.

11. Scheduling a Sequence of Cells Forming a Frame

A broad overview of frame processing is provided first. As noted above, frames refer to packets which are typically generated by data networks. Each frame is typically broken into small cells suitable for transmission on ATM backbones. The cells are reassembled to form a frame before being sent to the target end-application. LANE (Local Area Networks Emulation) is an example application of such breaking and reassembly. The header of ATM cells include bits to identify the frame boundaries, specifically the last cell in a sequence of cells forming a frame. With a determination of frame boundaries, frames can be efficiently transmitted in accordance with the present invention as described below with reference to FIGS. 3, 4 and 9. Connection queue 220-B of FIG. 3 will be assumed to be serving cells forming frames for illustration.

Figure 9:
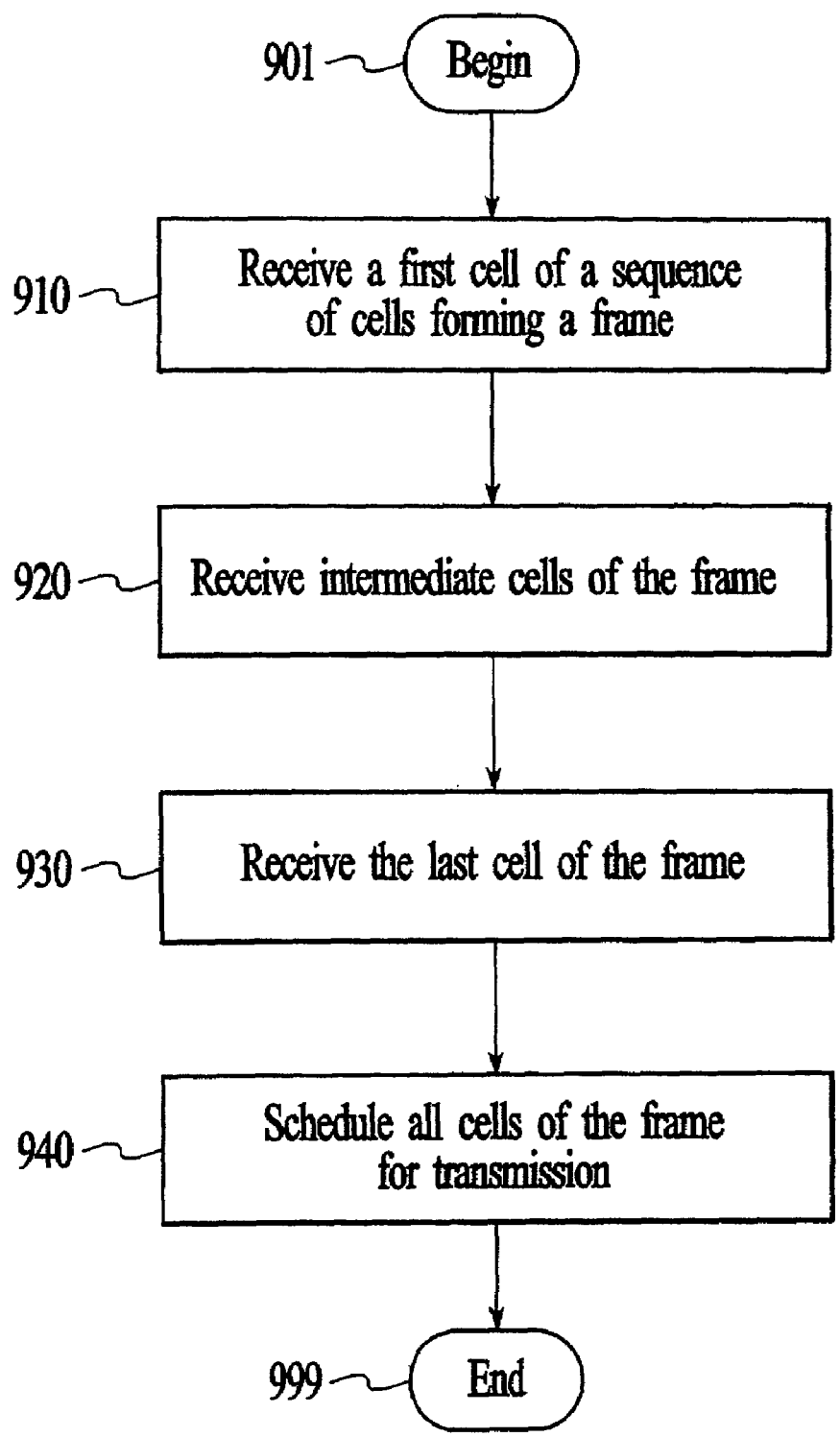
FIG. 9 is a flowchart illustrating the steps performed in processing a sequence of cells forming a frame in accordance with the present invention.

In step 910 of the flowchart of FIG. 9, queue manager 430 receives a first cell of a frame. In step 920, queue manager 430 receives the intermediate cells, and in step 930 the last cell of the frame is received. The received cells are placed in connection queue 220-B as they are received. In one embodiment, queue manager 430 determines that a received cell is a last cell by examining the header of the cell according to the ATM standard.

In step 940, scheduler 470 schedules for transmission all the cells of a frame stored in connection queue 220-B upon receiving the last cell of the frame. In one embodiment, scheduler 470 places only the head cell in a bucket (according to the schemes described above). When the head cell's time for transmission arrives, all the cells of the frame are also scheduled for transmission in successive turns allocated to the group the buckets belongs to.

That is, all the cells of the frame are treated as if they are all immediately behind the head cell in the same bucket.

While steps 910, 920, and 930 are performed, scheduler 470 may need to know that the frame is being assembled. Accordingly, queue manager 430 provides an indication if a first frame (i.e., frame corresponding to head cell in a connection queue) in a connection queue is being assembled. Scheduler 470 schedules the (first) frame of the connection queue only if the indication indicates that the frame is completely assembled. In one embodiment, a HPACTIVE bit is provided to indicate whether the head frame is completely assembled. The same bit indicates whether there are any active pending cells in a connection in the case of non-frame queues.

Thus, scheduler 470 places the head cell in an appropriate bucket once a determination is made that the frame assembly is complete. Then, all the cells of the frames can be transmitted in successive turns allocated to the group containing the bucket.

Even though cells of a frame are transmitted during successive cycles, frames of a connection are scheduled so as maintain fairness at a macro level. That is, when selecting a bucket for the head cell of a next frame, the bucket gap (between the current bucket and the bucket where the head cell of the next frame is placed) is computed to take into consideration not only the bandwidth allocated for the connection, but also the number of cells present in the transmitted frame.

In one embodiment, the bucket gap is proportional to the number of cells transmitted divided by the desired bandwidth of the connection. Accordingly, the bucket gap for successive cells can be made to be relatively short when more cells are transmitted for a frame. As a result, fairness may be maintained at a macro level across connections in a group. Several alternative embodiments may be implemented, for example, to minimize the processing overhead associated with counting the number of cells transmitted in a frame. For example, the bucket of a connection may be set while ignoring the number of cells transmitted in a frame.

That is, the bucket gap of a connection remains the same irrespective of number of cells transmitted on any individual frames.

Transmitting all cells of a frame in quick succession offers several advantages. For example, switches down the connection path need not provide extensive buffers for frame cells. In particular, as the last switch of a connection path may need to assemble the frame before transmitting to an end-system (or a data network), the buffering requirements in this switch are also minimized. Accordingly, a switch implemented in accordance with the present invention can be extended to support ports interfacing with data networks or end-systems using a frame as a basic unit of transmission.

In addition, the drop policy is simplified because all the cells may be dropped if one of the cells needs to be dropped. Such a drop policy eliminates need for unneeded transmission of cells forming only partial frames because partial frames are generally discarded anyway at the edge of the ATM network 450.

It should be understood that the frame cells may be transmitted on either unicast connections or multicast connections. Some considerations with multicast connections and the manner in which queue manager 430 may maintain the multicast connection queues for frame cells is described in detail in RELATED APPLICATION 1, incorporated in its entirety herewith.

Thus, the present invention provides an integrated framework which allows connections to be served fairly while allowing several other features specific to each connection. Connections can be shaped while minimizing memory and processing requirements. In addition, the shaping rate for shaped connections and the desired bandwidth for non-shaped connections can be varied dynamically. Further, cells forming a frame can be efficiently transmitted in an ATM network in accordance with the present invention.

12. CONCLUSION

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of processing a sequence of unicast cells forming a unicast frame in a switch, said method comprising:
   (a) receiving said sequence of unicast cells on a unicast virtual connection, said sequence of unicast cells including a head cell, a plurality of intermediate cells and a last cell together forming said unicast frame defined according to a protocol which defines a content of said unicast frame;
   (b) storing said sequence of unicast cells in said switch; and
   (c) forwarding said sequence of unicast cells on a port of said switch only after said last cell is received in said switch such that said first cell is transmitted only after reception of said last cell, said sequence of unicast cells being forwarded on the same unicast virtual connection as said unicast virtual connection on which said sequence of unicast cells are received such that said unicast virtual connection is not merged with other unicast virtual connections when said sequence of unicast cells are transmitted from said switch;

wherein (a) comprises receiving said sequence of unicast cells on a connection, wherein (b) comprises storing said sequence of unicast cells in a connection queue, and wherein the method further comprises:
   placing said head cell in one of a sequence of buckets of a group, wherein a plurality of groups are provided to serve an output port of said switch; and
   sending said sequence of unicast cells for transmission in successive turns allocated to said group immediately after the turn of said head cell in said one of said plurality of buckets is reached.

2. The method of claim 1, wherein said sequence of buckets serve a plurality of connections including said connection, wherein said method further comprises:
   storing in said connection queue a next unicast frame including a head cell, a last cell, and a plurality of intermediate cells on said connection; and
   placing said head cell of said next unicast frame in a bucket which is away from said one of said sequence of buckets storing said head cell of said frame by a number of buckets inversely proportional to the desired bandwidth for said connection such that said plurality of connections are scheduled fairly.

3. The method of claim 1, wherein said plurality of buckets form a group serving only connections transmitting frames, and each of said plurality of connections transmits only cells forming frames.

4. The method of claim 3, further comprising placing the head cell of said next unicast frame in said bucket only after said head cell of said transmitted frame is scheduled for transmission.

5. A switch for processing a sequence of unicast cells forming a frame in a switch, said switch comprising:
   means for receiving said sequence of unicast cells including a head cell, a plurality of intermediate cells and a last cell together forming said unicast frame defined according to a protocol which defines a content of said unicast frame;
   means for storing said sequence of unicast cells in said switch; and
   means for forwarding said sequence of unicast cells on a port of said switch only after said last cell is received in said switch such that said first cell is transmitted only after reception of said last cell, said sequence of unicast cells being forwarded on the same unicast virtual connection as said unicast virtual connection on which said sequence of unicast cells are received such that said unicast virtual connection is not merged with other unicast virtual connections when said sequence of unicast cells are transmitted from said switch;
   wherein said means for receiving comprises means for receiving said sequence of unicast cells on a connection, wherein said means for storm comprises means for buffering said sequence of unicast cells in a connection queue, and wherein the switch further comprises:
   means for placing said head cell in one of a sequence of buckets of a group, wherein a plurality of groups are provided to serve an output port of said switch; and
   means for sending said sequence of unicast cells for transmission in successive turns allocated to said group immediately after the turn of said head cell in said one of said plurality of buckets is reached.

6. The switch of claim 5, wherein said sequence of buckets serve a plurality of connections including said connection, wherein said switch further comprises:

means for storing in said connection queue a next unicast frame including a head cell, a last cell, and a plurality of intermediate cells on said connection; and means for placing said head cell of said next unicast frame in a bucket which is away from said one of said sequence of buckets storing said head cell of said frame by a number of buckets inversely proportional to the desired bandwidth for said connection such that said plurality of connections are scheduled fairly.

7. The switch of claim 6, wherein said number of buckets is also directly proportional to the number of cells in said frame.

8. The switch of claim 6, wherein said plurality of buckets form a group serving only connections transmitting frames, and each of said plurality of connections transmits only cells forming frames.

9. The switch of claim 8, further comprising means for placing the head cell of said next unicast frame in said bucket only after said head cell of said transmitted frame is scheduled for transmission.

10. A switch for processing a sequence of unicast cells forming a frame in a switch, said switch comprising:

an ingress processor receiving said sequence of unicast cells including a head cell, a plurality of intermediate cells and a last cell together forming said unicast frame defined according to a protocol which defines a content of said unicast frame;

a queue manager storing said sequence of unicast cells in said switch;

an output port transmitting said sequence of unicast cells; and a scheduler forwarding said sequence of unicast cells on a port of said switch only after said last cell is received in said switch such that said first cell is transmitted only after reception of said last cell, said sequence of unicast cells being forwarded on the same unicast virtual connection as said unicast virtual connection on which said sequence of unicast cells are received such that said unicast virtual connection is not merged with other unicast virtual connections when said sequence of unicast cells are transmitted from said switch;

wherein said ingress processor receives said sequence of unicast cells on a connection, wherein said queue manager stores said sequence of unicast cells in a connection queue, and wherein said scheduler places said head cell in one of a sequence of buckets of a group, wherein a plurality of groups are provided to serve said output port, and wherein said scheduler forwards said sequence of unicast cells for transmission in successive turns allocated to said group immediately after the turn of said head cell in said one of said plurality of buckets is reached.

11. The switch of claim 10, wherein said queue manager stores in said connection queue a next unicast frame including a head cell, a last cell, and a plurality of intermediate cells on said connection, and places said head cell of said next unicast frame in a bucket which is away from said one of said sequence of buckets storing said head cell of said frame by a number of buckets inversely proportional to the desired bandwidth for said connection such that said plurality of connections are scheduled fairly.

12. The method of claim 1, wherein said protocol comprises Internet protocol.

13. The switch of claim 5, wherein said protocol comprises Internet protocol.

14. The switch of claim 10, wherein said protocol comprises Internet protocol.

\* \* \* \* \*